United States Patent
Du (10) Patent No.: US 10,902,245 B2
(45) Date of Patent: Jan. 26, 2021

(54) METHOD AND APPARATUS FOR FACIAL RECOGNITION

(71) Applicant: Baidu Online Network Technology (Beijing) Co., Ltd., Beijing (CN)

(72) Inventor: Kang Du, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 255 days.

(21) Appl. No.: 16/050,436

(22) Filed: Jul. 31, 2018

(65) Prior Publication Data

US 2019/0087648 A1     Mar. 21, 2019

(30) Foreign Application Priority Data

Sep. 21, 2017    (CN) .......................... 2017 1 0858055

(51) Int. Cl.
| | |
|---|---|
| G06K 9/00 | (2006.01) |
| G06K 9/66 | (2006.01) |
| G06N 3/02 | (2006.01) |
| G06K 9/62 | (2006.01) |
| G06N 5/04 | (2006.01) |
| G06N 3/04 | (2006.01) |

(Continued)

(52) U.S. Cl.
CPC ....... *G06K 9/00288* (2013.01); *G06K 9/4628* (2013.01); *G06K 9/627* (2013.01); *G06K 9/6256* (2013.01); *G06K 9/66* (2013.01); *G06N 3/02* (2013.01); *G06N 3/0454* (2013.01); *G06N 3/0472* (2013.01); *G06N 3/08* (2013.01); *G06N 5/046* (2013.01)

(58) Field of Classification Search
CPC ............. G06K 9/00288; G06K 9/4628; G06K 9/6256; G06K 9/627; G06K 9/66; G06N 3/02; G06N 3/0454; G06N 3/0472; G06N 3/08; G06N 5/046
See application file for complete search history.

(56) References Cited

U.S. PATENT DOCUMENTS

| | | | |
|---|---|---|---|
| 8,542,928 B2 * | 9/2013 | Kaneda .............. | G06K 9/00281 382/190 |
| 9,449,432 B2 * | 9/2016 | Kanaujia .................. | G06T 7/60 |

(Continued)

FOREIGN PATENT DOCUMENTS

| | | |
|---|---|---|
| CN | 106548159 A | 3/2017 |
| CN | 107154023 A | 9/2017 |

*Primary Examiner* — Manav Seth
(74) *Attorney, Agent, or Firm* — Knobbe, Martens, Olson & Bear, LLP (57) ABSTRACT

Embodiments of the present disclosure disclose a method and apparatus for facial recognition. A specific embodiment of the method comprises: extracting a to-be-recognized dark light image captured in a dark light environment; inputting the dark light image into a pre-trained first convolutional neural network to obtain a target image after the dark light image is preprocessed, the first convolutional neural network being used to preprocess the dark light image; and inputting the target image into a pre-trained second convolutional neural network to obtain a facial recognition result, the second convolutional neural network being used to represent a corresponding relationship between the image and the facial recognition result. This embodiment improves accuracy of the facial recognition on the image captured in the dark light environment.

13 Claims, 5 Drawing Sheets

300

301

302

(51) Int. Cl.
*G06K 9/46* (2006.01)
*G06N 3/08* (2006.01)

(56) References Cited

U.S. PATENT DOCUMENTS

| | | | |
|---|---|---|---|
| 9,578,234 B2* | 2/2017 | Tran | H04N 7/181 |
| 9,589,210 B1* | 3/2017 | Estrada | G06T 7/74 |
| 9,749,738 B1* | 8/2017 | Adsumilli | H04R 3/005 |
| 9,767,565 B2* | 9/2017 | Estrada | G06T 7/73 |
| 9,904,849 B2* | 2/2018 | Estrada | G06N 3/04 |
| 9,940,544 B2* | 4/2018 | Lin | G06K 9/628 |
| 10,025,950 B1* | 7/2018 | Avasarala | G06K 9/00281 |
| 10,045,120 B2* | 8/2018 | Adsumilli | H04R 3/005 |
| 10,204,264 B1* | 2/2019 | Gallagher | H04N 21/44218 |
| 10,248,844 B2* | 4/2019 | Kim | G06K 9/00275 |
| 10,325,351 B2* | 6/2019 | Rad | G06F 17/18 |
| 10,460,209 B2* | 10/2019 | Li | G06K 9/6215 |
| 10,552,663 B2* | 2/2020 | Smith | G06K 9/6273 |
| 10,558,908 B2* | 2/2020 | Wang | G06T 5/50 |
| 10,574,883 B2* | 2/2020 | Purwar | G06K 9/036 |
| 2009/0310828 A1* | 12/2009 | Kakadiaris | G06K 9/4661 |
| | | | 382/118 |
| 2015/0178554 A1* | 6/2015 | Kanaujia | G06T 7/60 |
| | | | 382/118 |
| 2017/0199898 A1* | 7/2017 | Shen | G06K 9/00261 |
| 2017/0277955 A1* | 9/2017 | Liu | G06K 9/6298 |

* cited by examiner

METHOD AND APPARATUS FOR FACIAL RECOGNITION

CROSS-REFERENCE TO RELATED APPLICATIONS

This application is related to and claims priority from Chinese Application No. 201710858055.X, filed on Sep. 21, 2017 and entitled "Method and Apparatus for Facial Recognition," the entire disclosure of which is hereby incorporated by reference.

TECHNICAL FIELD

The present disclosure relates to the field of computer technology, specifically to the field of Internet technology, and more specifically to a method and apparatus for facial recognition.

BACKGROUND

As the Internet technology develops, the facial recognition technology has been used in more and more areas. For example, identities may be verified through the facial recognition. In general, in a situation where an image is dark, a texture in the image is not clear. Accordingly, the image needs to be preprocessed.

Generally, in the existing methods, the brightness of the image is increased directly, and then the facial recognition is performed on the image with increased brightness. However, the image noise is generally increased when the image brightness is increased directly, resulting in a blurred image. Therefore, the existing methods have an issue of low accuracy of the facial recognition result.

SUMMARY

An objective of some embodiments of the present disclosure is to provide an improved method and apparatus for facial recognition to solve the technical problem mentioned in the foregoing Background section.

In a first aspect, some embodiments of the present disclosure provide a method for facial recognition. The method includes: extracting a to-be-recognized dark light image captured in a dark light environment; inputting the dark light image into a pre-trained first convolutional neural network to obtain a target image after the dark light image is preprocessed, the first convolutional neural network being used to preprocess the dark light image; and inputting the target image into a pre-trained second convolutional neural network to obtain a facial recognition result, the second convolutional neural network being used to represent a corresponding relationship between the image and the facial recognition result.

In some embodiments, the method further includes establishing the first convolutional neural network. The establishing the first convolutional neural network includes: extracting a preset training sample, wherein the training sample includes a dark light sample image and a bright light sample image corresponding to the dark light sample image; and using the dark light sample image as an input, and training and obtaining the first convolutional neural network based on the bright light sample image and a preset loss function using a deep learning method, wherein a value of the loss function is used to represent a degree of difference between an image outputted by the first convolutional neural network and the bright light sample image.

In some embodiments, the method further includes training the first convolutional neural network. The training the first convolutional neural network includes: extracting a preset training sample and a pre-established generative adversarial network, wherein the training sample includes a dark light sample image and a bright light sample image corresponding to the dark light sample image, the generative adversarial network includes a generative network and a discriminative network, the generative network is a convolutional neural network for preprocessing an inputted image, and the discriminative network is used to determine whether the inputted image is an image outputted by the generative network; using the dark light sample image as an input of the generative network, and using the image outputted by the generative network and the bright light sample image as an input of the discriminative network to obtain a discrimination result outputted by the discriminative network; and statisticising an accuracy rate of the obtained discrimination result, and training, based on a machine learning method, the generative network and the discriminative network according to the accuracy rate, to define the generative network as the trained first convolutional neural network when the accuracy rate is a preset numerical value.

In some embodiments, the method further includes generating the training sample. The generating the training sample includes: preprocessing a plurality of first bright light images pre-captured in a bright light environment, to obtain a first dark light image corresponding to each of the plurality of first bright light images; and using the generated first dark light image as the dark light sample image, and using the plurality of first bright light images as the bright light sample image, to compose the training sample.

In some embodiments, the method further includes generating the training sample. The generating the training sample includes: preprocessing a plurality of second dark light images pre-captured in the dark light environment to obtain a second bright light image corresponding to each of the plurality of second dark light images; and using the plurality of second dark light images as the dark light sample image, and using the generated second bright light image as the bright light sample image, to compose the training sample.

In some embodiments, the dark light sample image is an image pre-captured in the dark light environment, and the bright light sample image corresponding to the dark light sample image is an image pre-captured in the bright light environment. Each dark light sample image and a corresponding bright light sample image are images of a given object captured at a given position and from a given angle.

In a second aspect, some embodiments of the present disclosure provide an apparatus for facial recognition. The apparatus includes: a first extracting unit, configured to extract a to-be-recognized dark light image captured in a dark light environment; a first inputting unit, configured to input the dark light image into a pre-trained first convolutional neural network to obtain a target image after the dark light image is preprocessed, the first convolutional neural network being used to preprocess the dark light image; and a second inputting unit, configured to input the target image into a pre-trained second convolutional neural network to obtain a facial recognition result, the second convolutional neural network being used to represent a corresponding relationship between the image and the facial recognition result.

In some embodiments, the apparatus further includes: a second extracting unit, configured to extract a preset training sample, wherein the training sample includes a dark light sample image and a bright light sample image corresponding to the dark light sample image; and a first training unit, configured to use the dark light sample image as an input, and train and obtain the first convolutional neural network based on the bright light sample image and a preset loss function using a deep learning method, wherein a value of the loss function is used to represent a degree of difference between an image outputted by the first convolutional neural network and the bright light sample image.

In some embodiments, the apparatus further includes: a third extracting unit, configured to extract a preset training sample and a pre-established generative adversarial network, wherein the training sample includes a dark light sample image and a bright light sample image corresponding to the dark light sample image, the generative adversarial network includes a generative network and a discriminative network, the generative network is a convolutional neural network for preprocessing an inputted image, and the discriminative network is used to determine whether the inputted image is an image outputted by the generative network; a third training unit, configured to use the dark light sample image as an input of the generative network, and use the image outputted by the generative network and the bright light sample image as an input of the discriminative network to obtain a discrimination result outputted by the discriminative network; and a second training unit, configured to statisticise an accuracy rate of the obtained discrimination result, and train, based on a machine learning method, the generative network and the discriminative network according to the accuracy rate, to define the generative network as the trained first convolutional neural network when the accuracy rate is a preset numerical value.

In some embodiments, the apparatus further includes: a first preprocessing unit, configured to preprocess a plurality of first bright light images pre-captured in a bright light environment, to obtain a first dark light image corresponding to each of the plurality of first bright light images; and a first composing unit, configured to use the generated first dark light image as the dark light sample image, and use the plurality of first bright light images as the bright light sample image, to compose the training sample.

In some embodiments, the apparatus further includes: a second preprocessing unit, configured to preprocess a plurality of second dark light images pre-captured in the dark light environment to obtain a second bright light image corresponding to each of the plurality of second dark light images; and a second composing unit, configured to use the plurality of second dark light images as the dark light sample image, and use the generated second bright light image as the bright light sample image, to compose the training sample.

In some embodiments, the dark light sample image is an image pre-captured in the dark light environment, and the bright light sample image corresponding to the dark light sample image is an image pre-captured in the bright light environment. Each dark light sample image and a corresponding bright light sample image are images of a given object captured at a given position and from a given angle.

In a third aspect, some embodiments of the present disclosure provide a server. The server includes: one or more processors; and a storage device, configured to store one or more programs. The one or more programs, when executed by the one or more processors, cause the one or more processors to implement the method in any embodiment of the method for facial recognition.

In a fourth aspect, some embodiments of the present disclosure provide a computer readable storage medium storing a computer program. The program, when executed by a processor, implements the method in any embodiment of the method for facial recognition.

In the method and apparatus for facial recognition provided by the embodiments of the present disclosure, the target image after the dark light image is preprocessed is obtained by inputting the to-be-recognized dark light image captured in the dark light environment into the pre-trained first convolutional neural network. Then, the target image is inputted into the pre-trained second convolutional neural network to obtain the facial recognition result. The operation of preprocessing the dark light image by using the convolutional neural network avoids the problem of great image noise caused by directly increasing image brightness, which may implement brightness enhancement and deblurring on the dark light image, thus improving the accuracy of the facial recognition on the image captured in the dark light environment.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
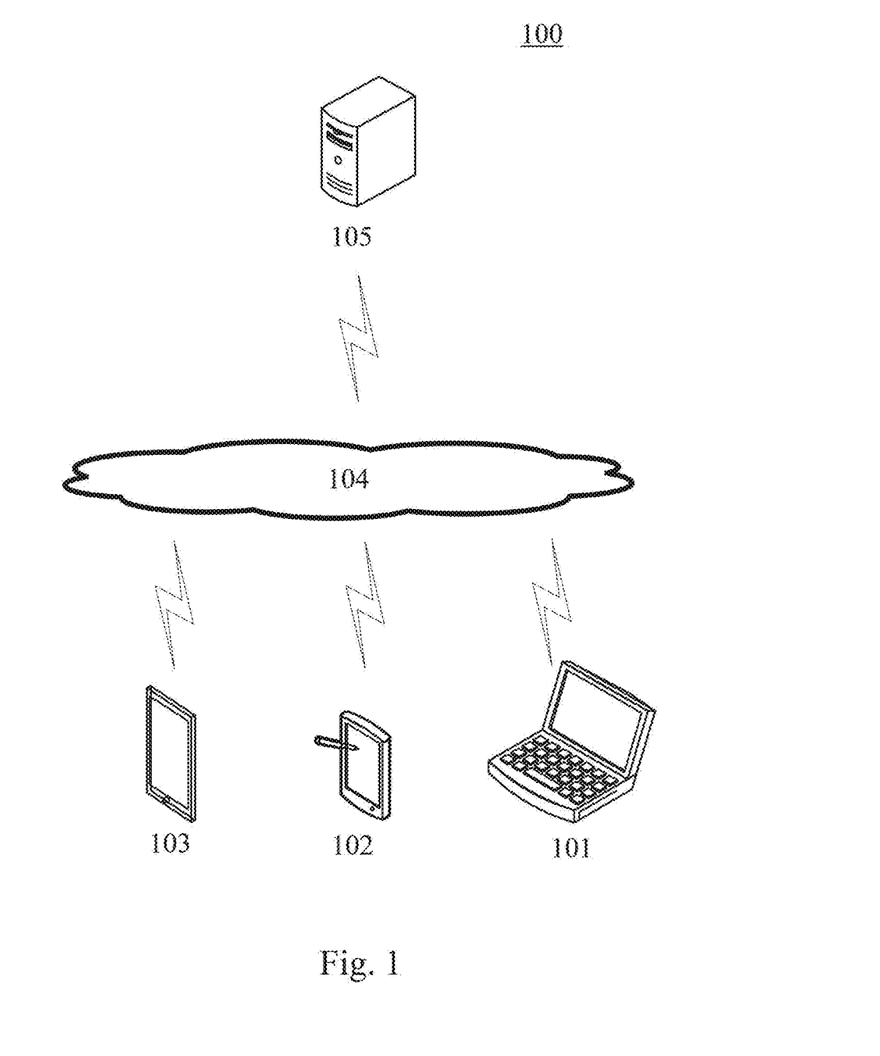
FIG. 1 is an architectural diagram of a system in which some embodiments of the present disclosure may be implemented.

FIG. 1 shows an architecture of a system 100 which may be used by a method for facial recognition or an apparatus for facial recognition according to some embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to receive or transmit messages, etc. Various communication client applications, such as photography applications, image processing applications, or search applications may be installed on the terminal devices 101, 102 and 103.

The terminal devices 101, 102 and 103 may be various electronic devices having display screens and supporting webpage browsing, including but not limited to, smart phones, tablet computers, laptop computers and desktop computers.

The server 105 may be a server providing various services, for example, an image processing server that processes images (such as dark light images) uploaded by the terminal devices 101, 102 or 103. The image processing server may perform processing including analyzing received images, and return a processing result (for example, a result of facial recognition) to the terminal devices.

It should be noted that the method for facial recognition according to some embodiments of the present disclosure is generally executed by the server 105. Accordingly, an apparatus for facial recognition is generally installed on the server 105.

It should be pointed out that the server 105 may store the to-be-recognized image locally, and may acquire the locally stored to-be-recognized image directly for recognition. In this case, the system architecture 100 may not include the terminal devices 101, 102 and 103 and the network 104.

It should be pointed out that an image processing application may be installed in the terminal devices 101, 102 and 103. The terminal devices 101, 102 and 103 may also perform the facial recognition on the to-be-recognized image based on the image processing application. In this case, the apparatus for facial recognition may also be executed by the terminal devices 101, 102 and 103, and accordingly, the apparatus for facial recognition may also be installed on the terminal devices 101, 102, and 103. In this case, the system architecture 100 may not include the server 105 and the network 104.

It should be understood that the numbers of the terminal devices, the networks and the servers in FIG. 1 are merely illustrative. Any number of terminal devices, networks and servers may be provided based on the actual requirements.

Figure 2:
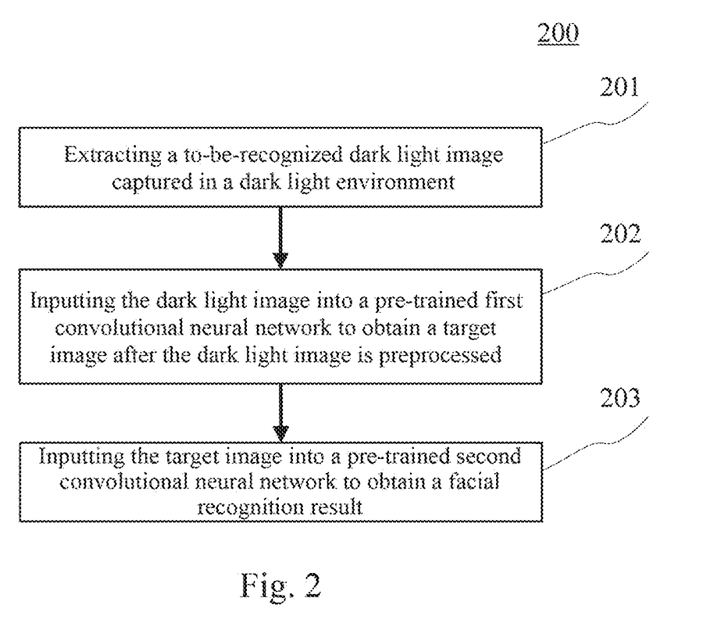
FIG. 2 is a flowchart of an embodiment of a method for facial recognition according to the present disclosure.

Further referring to FIG. 2, FIG. 2 illustrates a flow 200 of an embodiment of a method for facial recognition according to the present disclosure. The method for facial recognition includes the following steps.

Step 201, extracting a to-be-recognized dark light image captured in a dark light environment.

In some embodiments, an electronic device (e.g., the server 105 as illustrated in FIG. 1) on which the method for facial recognition is performed may extract the to-be-recognized dark light image captured in the dark light environment. Here, the dark light image may be sent to the electronic device by a client (e.g., the terminal devices 101, 102 and 103 as illustrated in FIG. 1) communicated with the electronic device by means of a wired connection or a wireless connection. The dark light image may also be locally stored by the electronic device. It should be pointed out that the wireless connection may include, but not limited to, a 3G/4G connection, a WiFi connection, a bluetooth connection, a WiMAX connection, a Zigbee connection, an UWB (ultra wideband) connection, and other wireless connections now known or to be developed in the future.

Step 202, inputting the dark light image into a pre-trained first convolutional neural network to obtain a target image after the dark light image is preprocessed.

In some embodiments, the electronic device may input the dark light image into the pre-trained first convolutional neural network to obtain the target image after the dark light image is preprocessed. The first convolutional neural network may be used to preprocess the dark light image. After the dark light image is inputted into the pre-trained first convolutional neural network, the first convolutional neural network may successively perform a downsampling process and an upsampling process to output the target image. The first convolutional neural network may include at least one convolutional layer, at least one pooling layer, at least one anti-pooling layer, and at least one deconvolutional layer. The convolutional layer may be used to extract an image feature. The pooling layer may be used to perform downsampling on the inputted information. The anti-pooling layer may be used to perform upsampling on the inputted information. The deconvolutional layer is used to perform deconvolution on the inputted information to transpose a convolutional kernel of the convolutional layer as a convolutional kernel of the deconvolutional layer to process the inputted information. The deconvolution is the inverse operation of the convolution and implements signal recovery. The last deconvolutional layer of the first convolutional neural network may output the target image. It should be noted that the outputted target image may be represented by an RGB (red, green, and blue) three-channel matrix, and the outputted target image may be the same as the dark light image in size. In practice, the convolutional neural network (CNN) is a feedforward neural network, and an artificial neuron of the neural network may respond to a part of surrounding cells within the coverage range. Thus, the convolutional neural network has excellent performance in image processing. Therefore, the convolutional neural network may be used to preprocess the image. It should be noted that the electronic device may obtain the first convolutional neural network using various training approaches (such as a supervised training approach, or an unsupervised training approach) and based on a training sample.

In some alternative implementations of this embodiment, the first convolutional neural network may be established through the following steps. First, a preset training sample may be extracted. The training sample may include a dark light sample image and a bright light sample image corresponding to the dark light sample image. Then, the dark light sample image may be used as an input using a deep learning method, and the first convolutional neural network is trained and obtained based on the bright light sample image and a preset loss function. The bright light sample image may also be represented by an RGB three-channel matrix. The loss function may use a Euclidean distance function, a hingle function, etc., and a value of the loss function may be used to represent a degree of difference between an image outputted by the first convolutional neural network and the bright light sample image. The smaller the loss function is, the smaller the degree of difference between an image outputted by the first convolutional neural network and the bright light sample image is. In the training process, the loss function may constrain the way and direction the convolutional kernel is modified. The purpose of the training is to minimize the value of the loss function. Therefore, a parameter of each convolutional kernel in the first convolutional neural network obtained after the training is a parameter corresponding to a minimum value of the loss function.

In some alternative implementations of this embodiment, the dark light sample image may be an image pre-captured in the dark light environment. The bright light sample image corresponding to the dark light sample image may be an image pre-captured in a bright light environment. Each dark light sample image and a corresponding bright light sample image are images of a given object captured at a given position and from a given angle.

In some alternative implementations of this embodiment, the dark light sample image and the bright light sample image corresponding to the dark light sample image may be generated through the following steps. First, a plurality of first bright light images pre-captured in the bright light environment may be preprocessed to obtain a first dark light image corresponding to each of the plurality of first bright light images. Then, the generated first dark light image may be defined as the dark light sample image, and the plurality of first bright light images may be defined as the bright light sample image. The dark light sample image and the bright light sample image may compose the training sample by the electronic device. It should be noted that the electronic device may preprocess the first bright light images using various image processing technologies. As an example, an image enhancement operation may be performed on the dark light image by means of gray-level histogram, interference suppression, edge sharpening, pseudo-color processing, etc., to increase the clarity of the target image. A color space transformation operation may also be performed on the above target image. Image coding compression, image recovery, image segmentation, image tilt correction, image graying, image layering, etc. may also be performed on the above target image, which will not be repeatedly described here.

In some alternative implementations of this embodiment, the dark light sample image and the bright light sample image corresponding to the dark light sample image may be generated through the following steps. First, a plurality of second dark light images pre-captured in the dark light environment may be preprocessed to obtain a second bright light image corresponding to each of the plurality of second dark light images. Then, the plurality of second dark light images may be defined as the dark light sample image, and the generated second bright light image may be defined as the bright light sample image. The dark light sample image and the bright light sample image may compose the training sample by the electronic device. It should be noted that the electronic device may preprocess the second dark light images using various image processing technologies. The preprocessing approaches for the second dark light images are basically the same as that of the first bright light images, which will not be repeatedly described here.

In some alternative implementations of this embodiment, the dark light sample image and the bright light sample image corresponding to the dark light sample image may be generated through the following steps. First, the plurality of first bright light images may be preprocessed to obtain the first dark light image corresponding to the each of the plurality of first bright light images. Meanwhile, the plurality of second dark light images may be preprocessed to obtain the second bright light image corresponding to the each of the plurality of second dark light images. Then, the generated first dark light image and the plurality of second dark light images may be defined as the dark light sample image, and the plurality of first bright light images and the generated second bright light image may be defined as the bright light sample image. The generated dark light sample image and the generated bright light sample image may compose the training sample by the electronic device.

Step 203, inputting the target image into a pre-trained second convolutional neural network to obtain a facial recognition result.

In some embodiments, the electronic device may input the target image into the pre-trained second convolutional neural network to obtain the facial recognition result. The second convolutional neural network is used to represent a corresponding relationship between the image and the facial recognition result. The facial recognition result may indicate a position of a facial region (e.g., may be represented by coordinates of an upper-left corner of the facial region and coordinates of a lower-right corner of the facial region) in the to-be-recognized image. In practice, the second convolutional neural network may be a fully convolutional network, and the last convolutional layer of the fully convolutional network may output position information of the facial region.

It should be noted that the second convolutional neural network may be obtained by performing the supervised training on the existing deep convolutional neural network (e.g., DenseBox, VGGNet, ResNet, and SegNet) by using the machine learning method and the training sample preset for the second convolutional neural network. The training sample may include a large number of images and an annotation of each image. The annotation may include an annotation for indicating whether a region is the facial region and an annotation for indicating the position of the facial region (e.g., a coordinate value).

Figure 3:
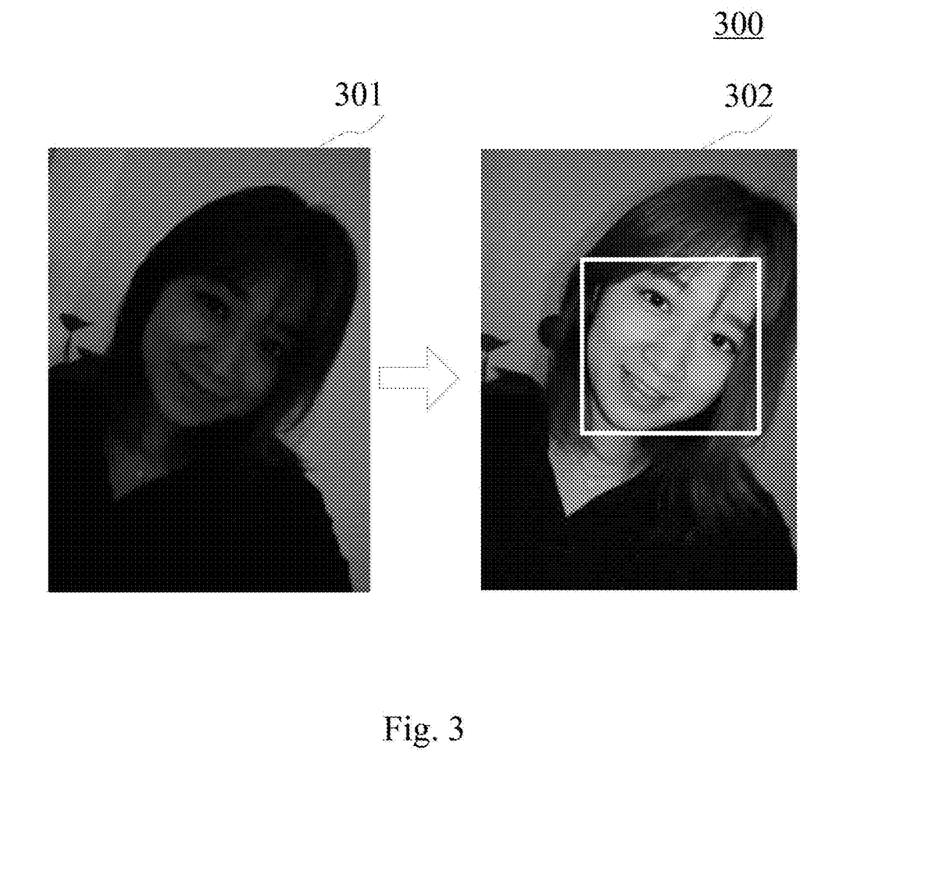
FIG. 3 is a schematic diagram of an application scenario of the method for facial recognition according to some embodiments of the present disclosure.

Further referring to FIG. 3, FIG. 3 is a schematic diagram of an application scenario of the method for facial recognition according to some embodiments. In the application scenario of FIG. 3, the client first uploads the to-be-recognized dark light image 301 captured in the dark light environment to the image processing server. Next, the image processing server inputs the dark light image 301 into the pre-trained first convolutional neural network to obtain the target image after the dark light image 301 is preprocessed. Then, the image processing server inputs the target image into the pre-trained second convolutional neural network to obtain the facial recognition result. The facial region in the dark light image 301 is displayed by the block (as shown in the image labelled by the reference numeral 302).

In the method provided by some embodiments of the present disclosure, the target image after the dark light image is preprocessed is obtained by inputting the to-be-recognized dark light image captured in the dark light environment into the pre-trained first convolutional neural network. Then, the target image is inputted into the pre-trained second convolutional neural network to obtain the facial recognition result. The operation of preprocessing the dark light image using the convolutional neural network avoids the problem of great image noise caused by directly increasing image brightness, which may implement brightness enhancement and deblurring on the dark light image, thus improving the accuracy of the facial recognition on the image captured in the dark light environment.

Figure 4:
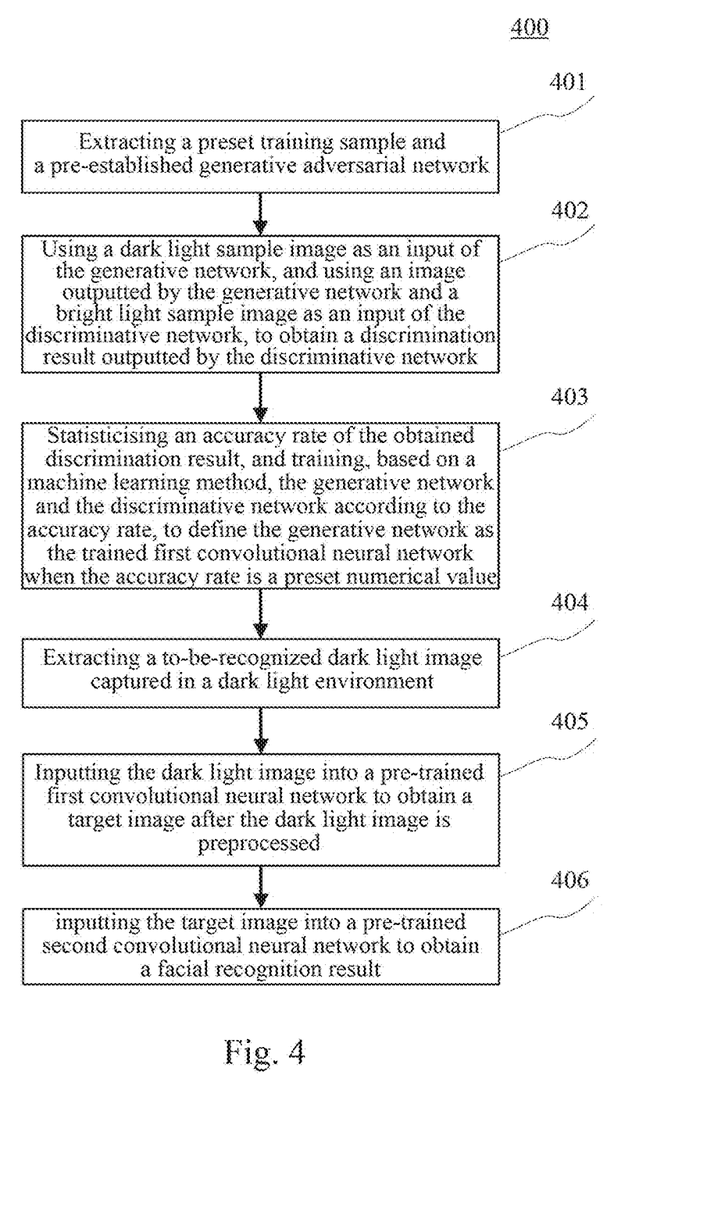
FIG. 4 is a flowchart of another embodiment of the method for facial recognition according to the present disclosure.

Further referring to FIG. 4, FIG. 4 illustrates a flow 400 of another embodiment of the method for facial recognition. The flow 400 of the method for facial recognition includes the following steps.

Step 401, extracting a preset training sample and a pre-established generative adversarial network.

In some embodiments, an electronic device (e.g., the server 105 as illustrated in FIG. 1) on which the method for facial recognition is performed may extract the preset training sample and the pre-established generative adversarial network (GAN). The training sample may include a dark light sample image and a bright light sample image corresponding to the dark light sample image. The generative adversarial network may include a generative network and a discriminative network. The generative network may be a convolutional neural network (e.g., various convolutional neural network structures including a convolutional layer, a pooling layer, an anti-pooling layer, and a deconvolutional layer, which may successively perform downsampling and upsampling) for preprocessing an inputted image. The discriminative network may be used to determine whether the inputted image is an image outputted by the generative network. In practice, the discriminative network may be a convolutional neural network (e.g., various convolutional neural network structures including a fully connected layer, where the fully connected layer may achieve a classification function). It should be noted that the image outputted by the generative network may be represented using an RGB three-channel matrix.

Step 402, using a dark light sample image as an input of the generative network, and using an image outputted by the generative network and a bright light sample image as an input of the discriminative network, to obtain a discrimination result outputted by the discriminative network.

In some embodiments, the electronic device may use the dark light sample image as the input of the generative network, and use the image outputted by the generative network and the bright light sample image as the input of the discriminative network to obtain the discrimination result outputted by the discriminative network. Here, the discriminative network may output 1 when determining that the inputted image is the image outputted by the generative network (from generated data). The discriminative network may output 0 when determining that the inputted image is not the image outputted by the generative network (from real data, i.e., the bright light sample image).

Step 403, statisticising an accuracy rate of the obtained discrimination result, and training, based on a machine learning method, the generative network and the discriminative network according to the accuracy rate, to define the generative network as the trained first convolutional neural network when the accuracy rate is a preset numerical value.

In some embodiments, the electronic device may statisticise the accuracy rate of the obtained discrimination result. Based on the machine learning method, the electronic device may train the generative network and the discriminative network according to the accuracy rate, to define the generative network as the trained first convolutional neural network when the accuracy rate is the preset numerical value (e.g., 50%). In practice, in the training process, the generative network and the discriminative network may be continuously and successively trained based on the accuracy rate. Specifically, the generative network may be first fixed, and the discriminative network may be optimized to make the discriminative network distinguish the real data from the generated data. Next, the discriminative network may be fixed, and the generative network may be improved to make the discriminative network unable to determine whether the inputted image is generated by the generative network. The iteration is continuously performed until the final convergence. At this time, the image generated by the generative network is close to the bright sample image, and the discriminative network cannot accurately distinguish the real data from the generated data (i.e., the accuracy rate is 50%).

Step 404, extracting a to-be-recognized dark light image captured in a dark light environment.

In some embodiments, the electronic device may extract the to-be-recognized dark light image captured in the dark light environment. Here, the dark light image may be sent to the electronic device by a client (e.g., the terminal devices 101, 102 and 103 as illustrated in FIG. 1) communicated with the electronic device by means of a wired connection or a wireless connection. The dark light image may also be locally stored by the electronic device.

Step 405, inputting the dark light image into a pre-trained first convolutional neural network to obtain a target image after the dark light image is preprocessed.

In some embodiments, the electronic device may input the dark light image into the pre-trained first convolutional neural network to obtain the target image after the dark light image is preprocessed. The first convolutional neural network may be used to preprocess the dark light image. After the dark light image is inputted into the pre-trained first convolutional neural network, the first convolutional neural network may successively perform a downsampling process and an upsampling process to output the target image. The first convolutional neural network may include at least one convolutional layer, at least one pooling layer, at least one anti-pooling layer, and at least one deconvolutional layer. The last deconvolutional layer of the first convolutional neural network may output the target image. It should be noted that the outputted target image may be represented by an RGB (red, green, and blue) three-channel matrix, and the outputted target image may be the same as the dark light image in size.

Step 406, inputting the target image into a pre-trained second convolutional neural network to obtain a facial recognition result.

In some embodiments, the electronic device may input the target image into the pre-trained second convolutional neural network to obtain the facial recognition result. The second convolutional neural network is used to represent a corresponding relationship between the image and the facial recognition result.

It should be noted that the operations of the steps 404-406 are basically the same as that of the steps 201-203, which will not be repeatedly described here.

As may be seen from FIG. 4, compared with the embodiment corresponding to FIG. 2, the flow 400 of the method for facial recognition in some embodiments emphasizes the step of training the first convolutional neural network based on the generative adversarial network. Therefore, in the solution described in some embodiments, a parameter of the first convolutional neural network trained and obtained using the generative adversarial network is determined based on the back propagation of the discriminative network, rather than directly from a data sample. Accordingly, the training of the first convolutional neural network may be implemented without depending on a sample with a large number of annotations, thereby improving the flexibility of the facial recognition on the image captured in the dark light environment.

Figure 5:
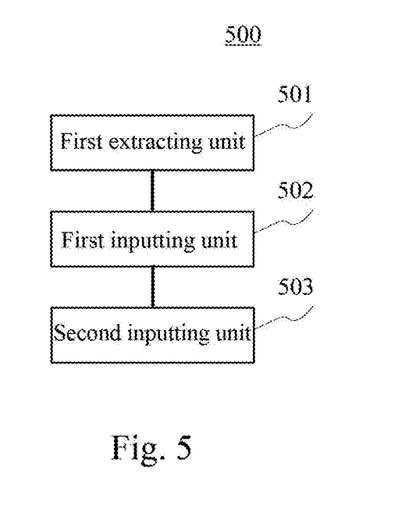
FIG. 5 is a schematic structural diagram of an embodiment of an apparatus for facial recognition according to the present disclosure.

Further referring to FIG. 5, as an implementation of the method shown in the above figures, the present disclosure provides an embodiment of an apparatus for facial recognition. The embodiment of the apparatus corresponds to the embodiment of the method as illustrated in FIG. 2, and this apparatus may be applied in various electronic devices.

As shown in FIG. 5, the apparatus for facial recognition 500 in some embodiments includes: a first extracting unit 501, configured to extract a to-be-recognized dark light image captured in a dark light environment; a first inputting unit 502, configured to input the dark light image into a pre-trained first convolutional neural network to obtain a target image after the dark light image is preprocessed, the first convolutional neural network being used to preprocess the dark light image; and a second inputting unit 503, configured to input the target image into a pre-trained second convolutional neural network to obtain a facial recognition result, the second convolutional neural network being used to represent a corresponding relationship between the image and the facial recognition result.

In some embodiments, the first extracting unit 501 may extract the to-be-recognized dark light image captured in the dark light environment.

In some embodiments, the first inputting unit 502 may input the dark light image into the pre-trained first convolutional neural network, to obtain the target image after the dark light image is preprocessed. The first convolutional neural network may be used to preprocess the dark light image. After the dark light image is inputted into the pre-trained first convolutional neural network, the first convolutional neural network may successively perform a downsampling process and an upsampling process to output the target image.

In some embodiments, the second inputting unit 502 may input the target image into a pre-trained second convolutional neural network to obtain the facial recognition result. The second convolutional neural network is used to represent the corresponding relationship between the image and the facial recognition result. In practice, the second convolutional neural network may be a fully convolutional network. The last convolutional layer of the fully convolutional network may output a confidence level of a facial region and position information of the facial region.

In some alternative implementations of this embodiment, the apparatus 500 for facial recognition may further include a second extracting unit and a first training unit (not shown). The second extracting unit may be configured to extract a preset training sample. The training sample includes a dark light sample image and a bright light sample image corresponding to the dark light sample image. The first training unit may be configured to use the dark light sample image as an input, and train and obtain the first convolutional neural network based on the bright light sample image and a preset loss function using a deep learning method. A value of the loss function is used to represent a degree of difference between an image outputted by the first convolutional neural network and the bright light sample image.

In some alternative implementations of this embodiment, the apparatus 500 for facial recognition may further include a third extracting unit, a third inputting unit, and a second training unit (not shown). The third extracting unit is configured to extract a preset training sample and a pre-established generative adversarial network. The training sample includes a dark light sample image and a bright light sample image corresponding to the dark light sample image. The generative adversarial network includes a generative network and a discriminative network. The generative network is a convolutional neural network for preprocessing an inputted image. The discriminative network is used to determine whether the inputted image is an image outputted by the generative network. The third inputting unit may be configured to use the dark light sample image as an input of the generative network, and use the image outputted by the generative network and the bright light sample image as an input of the discriminative network to obtain a discrimination result outputted by the discriminative network. The second training unit may be configured to statisticise an accuracy rate of the obtained discrimination result, and train, based on a machine learning method, the generative network and the discriminative network according to the accuracy rate, to define the generative network as the trained first convolutional neural network when the accuracy rate is a preset numerical value.

In some alternative implementations of this embodiment, the apparatus 500 for facial recognition may further include a first preprocessing unit and a first composing unit (not shown). The first preprocessing unit may be configured to preprocess a plurality of first bright light images pre-captured in a bright light environment, to obtain a first dark light image corresponding to each of the plurality of first bright light images. The first composing unit may be configured to use the generated first dark light image as the dark light sample image, and use the plurality of first bright light images as the bright light sample image, to compose the training sample.

In some alternative implementations of this embodiment, the apparatus 500 for facial recognition may further include a second preprocessing unit and a second composing unit (not shown). The second preprocessing unit may be configured to preprocess a plurality of second dark light images pre-captured in the dark light environment to obtain a second bright light image corresponding to each of the plurality of second dark light images. The second composing unit may be configured to use the plurality of second dark light images as the dark light sample image, and use the generated second bright light image as the bright light sample image, to compose the training sample.

In some alternative implementations of this embodiment, the dark light sample image may be an image pre-captured in the dark light environment. The bright light sample image corresponding to the dark light sample image may be an image pre-captured in the bright light environment. Each dark light sample image and a corresponding bright light sample image are images of a given object captured at a given position and from a given angle.

In the apparatus provided by some embodiments of the present disclosure, the first inputting unit 502 inputs the to-be-recognized dark light image captured in the dark light environment and extracted by the first extracting unit 501 into the pre-trained first convolutional neural network to obtain the target image after the dark light image is preprocessed. Then, the second inputting unit 503 inputs the target image into the pre-trained second convolutional neural network to obtain the facial recognition result. The operation of preprocessing the dark light image by using the convolutional neural network avoids the problem of great image noise caused by directly increasing image brightness, which may implement brightness enhancement and deblurring on the dark light image, thus improving the accuracy of the facial recognition on the image captured in the dark light environment.

Figure 6:
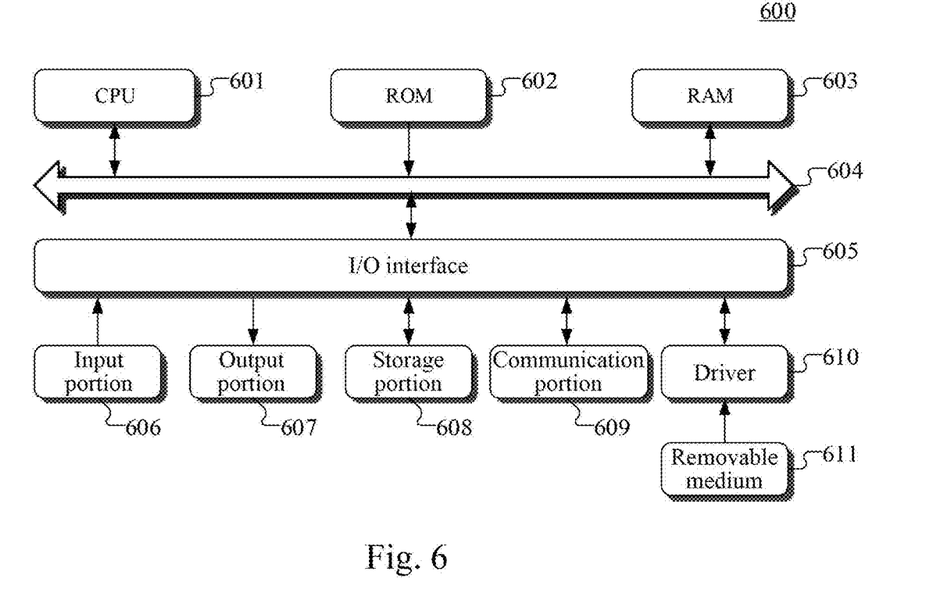
FIG. 6 is a schematic structural diagram of a computer system adapted to implement a server according to some embodiments of the present disclosure.

Referring to FIG. 6, a structural schematic diagram of a computer system 600 adapted to implement a server of some embodiments of the present disclosure is shown. The server shown in FIG. 6 is merely an example, and should not bring any limitations to the functions and the scope of use of some embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to some embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in some embodiments of the present disclosure may be implemented by means of software or hardware. The described units may also be provided in a processor, for example, described as: a processor, comprising a first extracting unit, a first inputting unit, and a second inputting unit, where the names of these units do not in some cases constitute a limitation to such units themselves. For example, the first extracting unit may also be described as "a unit for extracting a to-be-recognized dark light image captured in a dark light environment."

In another aspect, some embodiments of the present disclosure further provide a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by an apparatus, cause the apparatus to: extracting a to-be-recognized dark light image captured in a dark light environment; inputting the dark light image into a pre-trained first convolutional neural network to obtain a target image after the dark light image is preprocessed, the first convolutional neural network being used to preprocess the dark light image; and inputting the target image into a pre-trained second convolutional neural network to obtain a facial recognition result, the second convolutional neural network being used to represent a corresponding relationship between the image and the facial recognition result.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for facial recognition, comprising:
    establishing a first convolutional neural network, wherein the establishing the first convolutional neural network comprises:
        extracting a preset training sample, wherein the training sample includes a dark light sample image and a bright light sample image corresponding to the dark light sample image, and
        using the dark light sample image as an input, outputting an image by the first convolutional neural network with the input, and training the first convolutional neural network based on a comparison between the outputted image of the first convolutional neural network and the bright light sample image corresponding to the inputted dark light sample image;
    extracting a to-be-recognized dark light image captured in a dark light environment;
    inputting the dark light image into the first convolutional neural network to obtain a target image after the dark light image is preprocessed, the first convolutional neural network being used to preprocess the dark light image; and
    inputting the target image into a pre-trained second convolutional neural network to obtain a facial recognition result, the second convolutional neural network being used to represent a corresponding relationship between the image and the facial recognition result.

2. The method according to claim 1, wherein the using the dark light sample image as an input, outputting an image by the first convolutional neural network with the input, and training the first convolutional neural network based on a comparison between the outputted image of the first convolutional neural network and the bright light sample image corresponding to the inputted dark light sample image comprises:
    using the dark light sample image as the input, and training and obtaining the first convolutional neural network based on the bright light sample image and a preset loss function using a deep learning method, wherein a value of the loss function is used to represent a degree of difference between the image outputted by the first convolutional neural network and the bright light sample image.

3. The method according to claim 1, wherein the using the dark light sample image as an input, outputting an image by the first convolutional neural network with the input, and training the first convolutional neural network based on a comparison between the outputted image of the first convolutional neural network and the bright light sample image corresponding to the inputted dark light sample image comprises:
    extracting a pre-established generative adversarial network, wherein the generative adversarial network includes a generative network and a discriminative network, the generative network is a convolutional neural network for preprocessing an inputted image of the generative network, and the discriminative network is used to determine whether an inputted image of the discriminative network is an image outputted by the generative network;
    using the dark light sample image as an input of the generative network, and using the image outputted by the generative network and the bright light sample image as the input of the discriminative network to obtain a discrimination result outputted by the discriminative network; and
    statisticising an accuracy rate of the obtained discrimination result, and training, based on a machine learning method, the generative network and the discriminative network according to the accuracy rate, to define the generative network as the trained first convolutional neural network when the accuracy rate is a preset numerical value.

4. The method according to claim 1, further comprising generating the training sample, wherein the generating the training sample comprises:
    preprocessing a plurality of first bright light images pre-captured in a bright light environment, to obtain a first dark light image corresponding to each of the plurality of first bright light images; and
    using the generated first dark light image as the dark light sample image, and using the plurality of first bright light images as the bright light sample image, to compose the training sample.

5. The method according to claim 1, further comprising generating the training sample, wherein the generating the training sample comprises:
    preprocessing a plurality of second dark light images pre-captured in the dark light environment to obtain a second bright light image corresponding to each of the plurality of second dark light images; and
    using the plurality of second dark light images as the dark light sample image, and using the generated second bright light image as the bright light sample image, to compose the training sample.

6. The method according to claim 1, wherein the dark light sample image is an image pre-captured in the dark light environment, and the bright light sample image corresponding to the dark light sample image is an image pre-captured in the bright light environment, wherein each dark light sample image and a corresponding bright light sample image are images of a given object captured at a given position and from a given angle.

7. An apparatus for facial recognition, comprising:
    at least one processor; and
    a memory storing instructions, the instructions when executed by the at least one processor, cause the at least one processor to perform operations, the operations comprising:
    establishing a first convolutional neural network, wherein the establishing the first convolutional neural network comprises:
        extracting a preset training sample, wherein the training sample includes a dark light sample image and a bright light sample image corresponding to the dark light sample image, and
        using the dark light sample image as an input, outputting an image by the first convolutional neural network with the input, and training the first convolutional neural network based on a comparison between the outputted image of the first convolutional neural network and the bright light sample image corresponding to the inputted dark light sample image;
    extracting a to-be-recognized dark light image captured in a dark light environment;
    inputting the dark light image into the first convolutional neural network to obtain a target image after the dark light image is preprocessed, the first convolutional neural network being used to preprocess the dark light image; and inputting the target image into a pre-trained second convolutional neural network to obtain a facial recognition result, the second convolutional neural network being used to represent a corresponding relationship between the image and the facial recognition result.

8. The apparatus according to claim 7, wherein the using the dark light sample image as an input, outputting an image by the first convolutional neural network with the input, and training the first convolutional neural network based on a comparison between the outputted image of the first convolutional neural network and the bright light sample image corresponding to the inputted dark light sample image comprises:

using the dark light sample image as the input, and training and obtaining the first convolutional neural network based on the bright light sample image and a preset loss function using a deep learning method, wherein a value of the loss function is used to represent a degree of difference between the image outputted by the first convolutional neural network and the bright light sample image.

9. The apparatus according to claim 7, wherein the using the dark light sample image as an input, outputting an image by the first convolutional neural network with the input, and training the first convolutional neural network based on a comparison between the outputted image of the first convolutional neural network and the bright light sample image corresponding to the inputted dark light sample image comprises:

extracting a pre-established generative adversarial network, wherein the generative adversarial network includes a generative network and a discriminative network, the generative network is a convolutional neural network for preprocessing an inputted image of the generative network, and the discriminative network is used to determine whether an inputted image of the discriminative network is an image outputted by the generative network;

using the dark light sample image as an input of the generative network, and use the image outputted by the generative network and the bright light sample image as the input of the discriminative network to obtain a discrimination result outputted by the discriminative network; and statisticising an accuracy rate of the obtained discrimination result, and train, based on a machine learning method, the generative network and the discriminative network according to the accuracy rate, to define the generative network as the trained first convolutional neural network when the accuracy rate is a preset numerical value.

10. The apparatus according to claim 7, the operations further comprising:

preprocessing a plurality of first bright light images pre-captured in a bright light environment, to obtain a first dark light image corresponding to each of the plurality of first bright light images; and using the generated first dark light image as the dark light sample image, and use the plurality of first bright light images as the bright light sample image, to compose the training sample.

11. The apparatus according to claim 7, the operations further comprising:

preprocessing a plurality of second dark light images pre-captured in the dark light environment to obtain a second bright light image corresponding to each of the plurality of second dark light images; and using the plurality of second dark light images as the dark light sample image, and use the generated second bright light image as the bright light sample image, to compose the training sample.

12. The apparatus according to claim 7, wherein the dark light sample image is an image pre-captured in the dark light environment, and the bright light sample image corresponding to the dark light sample image is an image pre-captured in the bright light environment, wherein each dark light sample image and a corresponding bright light sample image are images of a given object captured at a given position and from a given angle.

13. A non-transitory computer storage medium storing a computer program, the computer program when executed by one or more processors, causes the one or more processors to perform operations, the operations comprising:

establishing a first convolutional neural network, wherein the establishing the first convolutional neural network comprises:

extracting a preset training sample, wherein the training sample includes a dark light sample image and a bright light sample image corresponding to the dark light sample image, and using the dark light sample image as an input, outputting an image by the first convolutional neural network with the input, and training the first convolutional neural network based on a comparison between the outputted image of the first convolutional neural network and the bright light sample image corresponding to the inputted dark light sample image;

extracting a to-be-recognized dark light image captured in a dark light environment;

inputting the dark light image into the first convolutional neural network to obtain a target image after the dark light image is preprocessed, the first convolutional neural network being used to preprocess the dark light image; and inputting the target image into a pre-trained second convolutional neural network to obtain a facial recognition result, the second convolutional neural network being used to represent a corresponding relationship between the image and the facial recognition result.

* * * * *